United States Patent
Falk

(10) Patent No.: US 10,725,882 B2
(45) Date of Patent: Jul. 28, 2020

(54) MONITORING AN INTEGRITY OF A TEST DATASET

(71) Applicant: Siemens Aktiengesellschaft, Munich (DE)

(72) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 99 days.

(21) Appl. No.: 15/762,331

(22) PCT Filed: Aug. 8, 2016

(86) PCT No.: PCT/EP2016/068832
§ 371 (c)(1),
(2) Date: Mar. 22, 2018

(87) PCT Pub. No.: WO2017/050479
PCT Pub. Date: Mar. 30, 2017

(65) Prior Publication Data
US 2018/0276095 A1  Sep. 27, 2018

(30) Foreign Application Priority Data

Sep. 24, 2015 (DE) .................. 10 2015 218 373

(51) Int. Cl.
*G06F 11/00* (2006.01)
*G06F 11/263* (2006.01)
(Continued)

(52) U.S. Cl.
CPC .......... *G06F 11/263* (2013.01); *G06F 21/602* (2013.01); *H04L 9/3242* (2013.01); *H04L 63/123* (2013.01); *H04L 67/12* (2013.01)

(58) Field of Classification Search
CPC .... G06F 11/263; G06F 21/602; H04L 9/3242; H04L 63/123
See application file for complete search history.

(56) References Cited

U.S. PATENT DOCUMENTS 7,254,758 B2 * 8/2007 Thalmann .............. G11C 29/56
714/718
7,428,636 B1 * 9/2008 Waldspurger ......... H04L 63/083
713/164
(Continued)

FOREIGN PATENT DOCUMENTS

CN       103053131 A    4/2013
CN       104270376 A    1/2015
(Continued)

OTHER PUBLICATIONS

Falk et al: "Security Service for the Rollout of Security Credentials in Ubiquitous Industrial Automation Environments"; Service Computation 2010; pp. 104-110; ISBN: 978-1-61208-105-2; XP055073477; 2010.

(Continued)

*Primary Examiner* — Esaw T Abraham
(74) *Attorney, Agent, or Firm* — Schmeiser, Olsen & Watts LLP

(57) ABSTRACT

A method as well as a crypto-arrangement and a computer program product for monitoring an integrity of a test dataset, wherein a random sample of a test dataset is checked for integrity is provided. The method for monitoring an integrity of a test dataset includes the following steps: random sample-type selection of the test dataset from a dataset to be transferred via a communications connection; cryptographically protected provision of the selected test dataset to a test unit, wherein a communication via the communications connection is carried out uninfluenced by the selection and preparation; testing of the cryptographically protected test dataset for integrity by the test unit, based on cryptographic calculations and plausibility information.

13 Claims, 2 Drawing Sheets

(51) Int. Cl.
*H04L 29/06* (2006.01)
*H04L 29/08* (2006.01)
*G06F 21/60* (2013.01)
*H04L 9/32* (2006.01)

(56) References Cited

U.S. PATENT DOCUMENTS

| | | | |
|---|---|---|---|
| 7,672,452 B2* | 3/2010 | Penugonda | G01R 31/31719 380/2 |
| 8,185,877 B1* | 5/2012 | Colcord | G06F 9/44 717/124 |
| 8,661,263 B2* | 2/2014 | Mattsson | G06F 21/6209 713/189 |
| 9,048,862 B2* | 6/2015 | Condict | H03M 7/607 |
| 9,098,632 B2* | 8/2015 | Cook | G06F 8/38 |
| 9,152,579 B2* | 10/2015 | Mattsson | G06F 21/6209 |
| 9,379,855 B2* | 6/2016 | Hurst | H04L 1/24 |
| 9,684,866 B1* | 6/2017 | Todd, Jr. | G06N 5/02 |
| 2012/0158903 A1 | 6/2012 | Falk et al. | |
| 2013/0132730 A1 | 5/2013 | Falk | |

FOREIGN PATENT DOCUMENTS

| | | |
|---|---|---|
| DE | 102009039097 B3 | 11/2010 |
| DE | 102010033229 A1 | 2/2012 |
| WO | 9847264 A1 | 10/1998 |
| WO | WO98/47264 | 10/1998 |

OTHER PUBLICATIONS

PCT International Search Report for PCT International Application No. PCT/EP2016/068832, dated Oct. 28, 2016.

Office Action in related Chinese Patent Application No. 201680055945.0, dated Mar. 17, 2020. 8 pages.

* cited by examiner

MONITORING AN INTEGRITY OF A TEST DATASET

CROSS-REFERENCE TO RELATED APPLICATIONS

This application claims priority to PCT Application No. PCT/EP2016/068832, having a filing date of Aug. 8, 2016, based off of German application No. 102015218373.4, having a filing date of Sep. 24, 2015, the entire contents of both of which are hereby incorporated by reference.

FIELD OF TECHNOLOGY

The following relates to a method and a crypto-arrangement and a computer program product for monitoring an integrity of a test dataset, wherein the integrity of a random sample of the test dataset is checked.

BACKGROUND

In automation systems or in the Internet of Things, applications or devices are to be protected against IT attacks. In this environment, stringent requirements often apply to latency or delay of the data communication. Simple devices equipped with little processing capacity are often provided in the Internet of Things. In order to achieve a sufficient level of protection, it is neither practicable nor economical in many application scenarios to protect each individual small system or each individual data packet or each individual communication connection sufficiently robustly against attacks. Additionally provided cryptographic protective measures frequently cannot be retrofitted in a simple manner, particularly in the case of old devices or external devices. Even if integrated security solutions are used, the level of protection is often not sufficient, since control software may be manipulated or cryptographic keys for protecting a communication may be compromised in the automation system environment.

From Offenlegungsschrift (patent application, unexamined and first publication) DE 10 2010 033229 A1, it is known to obtain integrity-checking information for control data, said information being transmitted in a cryptographically protected form and checked. The check is carried out separately from the control data to be transmitted.

It is furthermore known from patent specification DE 10 2009 039097 B3 to provide a cryptographically protected data structure over a value range in addition to the transmission of the unsecured measured values. The cryptographically protected data structure over the value range can be used to check measured values that are predictable for a specific time period.

SUMMARY

An aspect relate to ensuring, in a simple manner with little processing requirement, a functional integrity for a dataset that is to be transmitted in real time via a communication connection.

Embodiments of the invention relate to a method for monitoring an integrity of a distributed system, having the following steps:

definition, on a random sample basis, of a test dataset depending on a dataset that is to be transmitted via a communication connection of the distributed system;

cryptographically protected provision of the test dataset to a checking unit, wherein the dataset is transmitted via the communication connection in such a way that it is unaffected by the definition and provision;

checking of the integrity of the cryptographically protected test dataset by the checking unit using cryptographic calculations and plausibility information.

Through embodiments of the invention, the integrity of a distributed system, in particular a distributed control system with sensors and actuators, is checked by acquiring and checking a test dataset as a random sample. The random sample is acquired and checked independently from the transmitted dataset. A delay in the transmission and processing of the transmitted dataset is thereby avoided, so that embodiments of the invention is also usable in the case of stringent real-time requirements, such as e.g. drive control. In the case of a cryptographic protection of the dataset, delays would occur due to the generation and checking of the cryptographic protection.

Embodiments of the invention are furthermore advantageously usable in safety-critical systems in which the transmission and processing of the dataset is not to be affected by security measures, i.e. in which freedom from repercussions is to be guaranteed. Otherwise, security measures would also have to be investigated and certified in terms of their safety characteristics in a safety evaluation.

Embodiments of the invention are particularly advantageously usable in control systems in which an information transmission itself does not need to be cryptographically protected, as in data transmission systems, but in which the correct functionality of a control functionality is to be monitored. An integrity violation of the data transmission can thereby also be detected indirectly on the basis of the checking of the random samples. The random samples are not only cryptographically checked but plausibility is also checked for this purpose. The plausibility of a test dataset per se can be checked, the plausibility between a plurality of test datasets can be checked, the plausibility between the test dataset and the transmitted dataset can be checked, and the plausibility can be checked with other plausibility information, e.g. project planning data, configuration data, physical characteristics of a process or of components.

The random sample is acquired via the definition on a random sample basis and the cryptographic method for the cryptographically protected provision is used with no impact on the transmission of the dataset via the communication connection. A data transmission is continued unaffected by the formation of the cryptographically protected dataset. A freedom of the IT security protection from repercussions on the normal operation which is carried out by the transmission of the dataset is thus guaranteed. The method is therefore advantageously usable in safety-critical systems or in systems with stringent real-time requirements also. The cryptographically protected test dataset can be transmitted via the same communication connection as that used for the transmission of the dataset or via a separate communication connection, for example via mobile telecommunication, Bluetooth, ZigBee or NFC.

A test dataset is selected, for example, on a random sample basis from the dataset to be transmitted. Alternatively, the test dataset is acquired separately, e.g. in hardware.

The cryptographically protected provision is carried out, for example, by adding a cryptographic checksum, for example using key-based hash functions or message authentication codes, or by forming a digital signature. Keyless checksums can furthermore be provided. The protection is achieved in each case through cryptographic calculations by a checking unit. In particular, a keyless or key-based checksum is formed for this purpose on the basis of the test dataset which is transmitted in addition to the checksum formed in this way. A signature check is furthermore carried out using key pairs in the case of signatures transmitted for protection.

In particular, the cryptographically protected test dataset is similarly checked independently from the transmission of the dataset. If the checking of the cryptographically protected test dataset by the checking unit cannot ensure an integrity of the test dataset, a data transmission can be stopped, for example, at the earliest possible time. In particular, an alarm signal is transmitted as soon as possible. Nevertheless, the data transmission is initially continued without repercussions by means of the method. A high data throughput and a short delay are thus achievable in the normal case in which a manipulation of datasets does not occur.

In cases where a manipulation is detected by the checking, the intervention takes place as quickly as possible and thereby corrects, for example, already transmitted datasets, for example an already transmitted sensor value. In the case of a manipulated, already transmitted sensor value, for example, a processing of the value or an evaluation or a log entry is cancelled or adapted.

In response to a detected manipulation, a device, for example the field device transmitting or receiving the dataset, may, for example, adopt an intrinsically safe state, initiate a restart, etc. the device concerned may, in particular, be listed with other devices as blocked.

An extract from a dataset to be transmitted via the data communication connection can be used as a test dataset. Different requirements can be imposed for recognizing the integrity of the test dataset. An integrity can be recognized, for example, only if the test dataset can be proven to be intact, for example using checksum methods. An integrity can furthermore be recognized, for example, only if the authenticity of the protected test dataset is also detected. This is achieved, in particular, using key-based checksums or digital signatures.

Plausibility information on the basis of which the plausibility of the content of the test dataset is examined is furthermore used to establish integrity. Value ranges of values of the test dataset, for example, are checked. Measured values unexpectedly differing from the plausibility values have the effect that the integrity is not recognized. Statistical parameters can also be used for the evaluation. These reflect, for example, patterns of control commands transmitted in an automation system, for example the frequency or sequence of start/stop commands. The plausibility information can furthermore be derived from simulated data which are determined using simulation models and the data of the test dataset. Redundant data can similarly be compared with one another.

Along with the checking of the authenticity or identity of the cryptographically protected test dataset, a plausibility test is furthermore provided. Only then is the integrity recognized. The monitoring of the functional integrity of a test dataset is relevant, in particular, in the control communication environment with the transmission of sensitive information from sensors or actuators. This is advantageously achieved through the combination of cryptographic calculations and a comparison with plausibility information.

In systems with stringent protection requirements, the method can advantageously be used as an additional level of protection. In particular, depending on requirements for real-time capability, it is possible to switch between the proposed method and other methods with a greater processing requirement. Cryptographic monitoring of a complete system is advantageously not required. According to the proposed method, operational, genuine communication does not need to be cryptographically protected. As a result, the described approach is also applicable in the case of extremely real-time-critical systems. Furthermore, not only the data transmission is protected, but also the data processing, for example on a control device. A separate development of both aspects is possible through the separation of the security functionality from the control functionality. Additional features can thus be quickly introduced.

According to one design, a communication via the communication connection is a control communication and control data or sensor values or input or output signals from sensors or actuators are transmitted as the dataset. Particularly in a control communication, an integrity checking method is required which is carried out independently from the control software as such. Since the control software above all is susceptible to manipulation attacks, a particularly secure integrity check is presented by the proposed method.

According to one design, a result which confirms an integrity of the test dataset or provides an alarm signal is deliverable by the check. Depending on the result, a specified response can take place, for example in the execution of control software, such as, for example, the interruption of the data connection or a stopping of the processing of received sensor values or control commands. Moreover, an alarm signal can initiate further steps, for example in order to identify a vulnerability. A control unit, for example, which processes the dataset controls a log entry with the date of the received data whose integrity could not be confirmed, or the sender or content.

According to one design, the result certifies integrity by means of cryptographically protected information. Since the integrity check on the dataset, including the selection on a random sample basis and cryptographically protected provision, takes place without repercussion on the data communication, the cryptographic checking process is also to be secured accordingly. This is done, in particular, via a certification, for example using signature methods or certificates. It is thus advantageously not possible to pretend that an integrity is confirmed by the checking method. The checking unit can be authenticated, for example, via the confirmation information.

According to one design, the test dataset is acquired as a limited, in particular digital, signal extract on an input or output interface of a control device. To do this, for example, a control device may have an integrated component which captures a snapshot as a random sample directly at the input or output interface and provides it in cryptographically protected form. An analog or digital sensor value, for example, or analog or digital actuator control parameters or a control communication of a network communication interface can be transmitted. The random sample information advantageously cannot be manipulated by software of the control device.

A particularly high protection is advantageously provided if the snapshots are captured in hardware or close to an input/output functionality, since the protection cannot then be manipulated by software.

According to one design, the definition on a random sample basis is carried out depending on a random value or on specified times or on measured quantities. In particular, the frequency of a monitoring of individual test datasets in a data communication can thus be varied. With a random selection of the random samples, a prediction of a monitoring action is advantageously hindered. An attacker wishing to manipulate data that are to be transmitted must at all times expect a creation of a cryptographically protected test dataset.

According to one design, key material, in particular a symmetric or asymmetric key pair, is used for the cryptographic calculations.

A security level can be variably selected, in particular through the selection of the cryptographic key which is selected for the selected cryptographic method to protect the test dataset.

According to one design, the plausibility information relates to a further test dataset or the dataset that is to be transmitted or data of the distributed system. The plausibility check may have to meet differently stringent or extensive requirements. A plurality of plausibility checks may be combined using different plausibility information.

Embodiments of the invention furthermore relate to a crypto-arrangement for monitoring an integrity of a distributed system, comprising:

a definition unit for the definition, on a random sample basis, of a test dataset depending on a dataset that is to be transmitted via a communication connection;

a crypto-unit for the cryptographically protected provision of the test dataset, wherein a transmission of the dataset via the communication connection is unaffected by the definition and provision;

a checking unit with an interface for receiving the cryptographically protected test dataset to check the integrity of the test dataset using cryptographic calculations and plausibility information.

The definition unit is, for example, an integrated component of a control device. In the case of an FPGA-based system on chip with programmable logic and a central processor unit, for example a CPU, soft CPU or hard CPU, the definition unit is implemented in the FPGA logic. In this case, the crypto-unit can similarly be implemented in the FPGA logic. The crypto-unit has, in particular, access to a cryptographic key, for example via a key memory. The test dataset or snapshot is captured, for example, in a control computer via a communication interface or in a field device in an FPGA with input/output functionality or in a separate input/output module, or in a system on chip with an input/output unit integrated therein, or in a separate integrated main processor unit or CPU, e.g. for the internal monitoring of the input/output unit, for example for repercussion-free snooping. The test dataset is furthermore acquired as integrated into an analog or digital sensor or actuator. A sensor or actuator may capture a digital snapshot and provide it in cryptographically protected form or may record data packets on a communication interface and provide them in cryptographically protected form as a random sample.

The checking unit has access to key material for checking the cryptographically protected test dataset. A symmetric encryption method is provided, for example, between the crypto-unit and the checking unit. An asymmetric method can similarly be used in which the checking unit checks a digital signature of the crypto-unit with a public key of the crypto-unit.

The checking unit acts as an integrity observer and checks the integrity by means of a trusted function. The trusted function is represented, in particular, by the cryptographic checking method. Both a cryptographic checksum of the random samples, for example, and the content of the random sample are verified. The plausibility information may take into account, for example, information provided by an engineering system or a characteristic of received sensor values. The random sample, i.e. the test dataset, may be provided by a participating node within a control system, such as, for example, a control computer, sensor or actuator, in the function of the selection unit and the crypto-unit itself or it may alternatively be listened into and provided in cryptographically protected form by an additional component which represents the selection unit or the crypto-unit.

The proposed solution offers the advantage that the interaction of a plurality of components in a distributed control system can be monitored. Both the integrity of a control system itself and the data transmission of control data can be monitored.

According to a further design, a communication via the communication connection is a control communication and the dataset has control data or sensor values or input or output signals of sensors or actuators.

According to one design, the selection of a crypto-unit is configured as an integrated component of a control device or of a sensor or actuator.

Embodiments of the invention furthermore relates to a computer program product with a first computer program which has means for carrying out the method according to one of the preceding designs if the first computer program is implemented on a first program-controlled device for execution.

According to one development, the first computer program is executable on the first program-controlled device separately from a further computer program which has means for performing a control, if the further computer program is implemented on a further program-controlled device for execution. The test dataset is acquired and cryptographically protected, for example, by a separate processor unit provided on a programmable logic or by a separate computing core. The software for acquiring and protecting a random sample is thus advantageously independent from actual control software. Even in the case of manipulated control software, the random sample functionality which is required for an integrity monitoring is unaffected. In one variant, the random sample is acquired on the control device in software, but is executed in a separate execution environment, for example executed separately by a hypervisor or separately in a trust zone.

BRIEF DESCRIPTION

Some of the embodiments will be described in detail, with reference to the following figures, wherein like designations denote like members, wherein.

DETAILED DESCRIPTION

Figure 1:
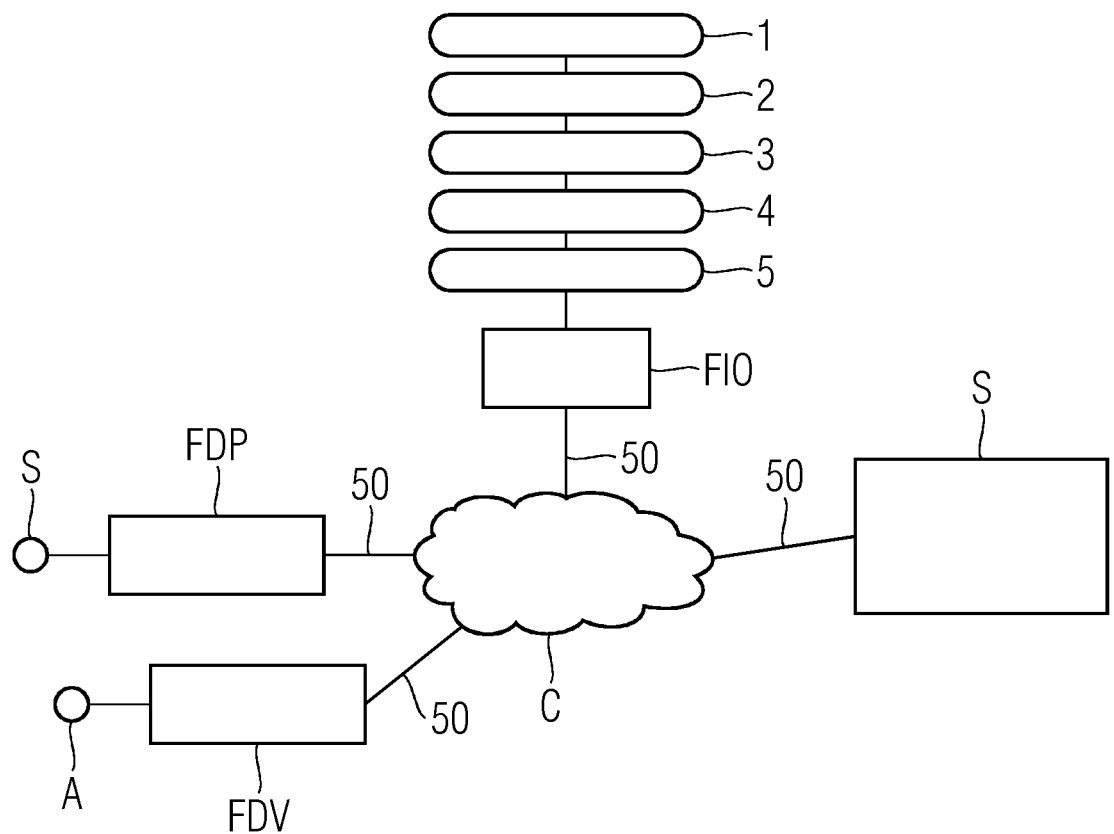
FIG. 1 shows a schematic representation of a networked control system with a crypto-arrangement according to a first example embodiment of the invention.

FIG. 1 shows schematically a networked control system with a field device for measuring pressure FDP which transmits the acquired measurement data via a control network C to a control computer or control server S. The pressure field device FDP is connected to a pressure sensor S for this purpose. The control computer S transmits control instructions to the control device FDV. The latter is connected to a valve as the actuator A.

The data transmission is carried out cyclically, for example every millisecond. The control network C is, for example, an IP-based network which interconnects a multiplicity of field devices, such as, for example, further sensors or switches. A functional integrity observer FIO which checks the integrity of the random samples of the data to be transmitted, either the sensor data or the transmitted control commands, is similarly connected via the control network C.

The pressure field device FDP and the control device FDV, the control server C, the sensor S and the actuator A in each case create a cryptographically protected random sample 50. According to the present example, this random sample is transmitted via the control network C to the functional integrity observer FIO. A random sample contains identification information of the creator of the random sample, the acquired random sample data and a cryptographic checksum. The functional integrity observer FIO in each case acquires a separate random sample 1-5 for each of the components. A validation is then carried out in each case using the random samples. The functional integrity observer preferably additionally acquires the cryptographically unprotected transmitted data associated with the random samples 1-5 and checks whether they are consistent with the cryptographically protected random samples. Alternatively, the plausibility check is carried out on the content of the cryptographically protected test data on the basis of stored reference values.

If the check produces a result which cannot confirm an integrity, an alarm signal is transmitted. Individual devices, for example, or all devices, or only the device which has triggered an alarm adopt an intrinsically safe operational state or provide a local alarm signal, for example to alert service personnel.

The random samples 1-5 can be transmitted with a delay in relation to the transmission of the associated data. This means that they do not, or do not to the same extent as the actual measurement data or control data, have to be transmitted and processed with little latency.

Along with an implementation of the functional integrity observer FIO as an additional node, an integrated functionality of the control server S is also conceivable. It can similarly be implemented in a higher-level control system, in particular a SCADA system, or in a backend system or a cloud service.

The evaluation algorithms of the functional integrity observer FIO for detecting integrity violations can carry out different checks. These can be provided individually or in combination with one another. In the absence of random samples, for example, an integrity of the entire system cannot be recognized. The random samples may furthermore contain measured values which are outside provided value ranges. Statistical parameters can furthermore be evaluated, such as, for example, frequency of transmission errors or the like. A plausibility check can also be carried out using a simulation model of the automation system. To do this, the simulation can be loaded with the measurement data or control data transmitted in unprotected form. A similarity comparison between the actual random samples and the random samples determined in the simulation model can thus be carried out. Cross-checks can also be carried out on a plurality of redundant datasets, and the unprotected control commands can also be loaded onto a virtual control functionality. The plausibility of this simulated control can also be checked through a similarity comparison with the received random samples.

Figure 2:
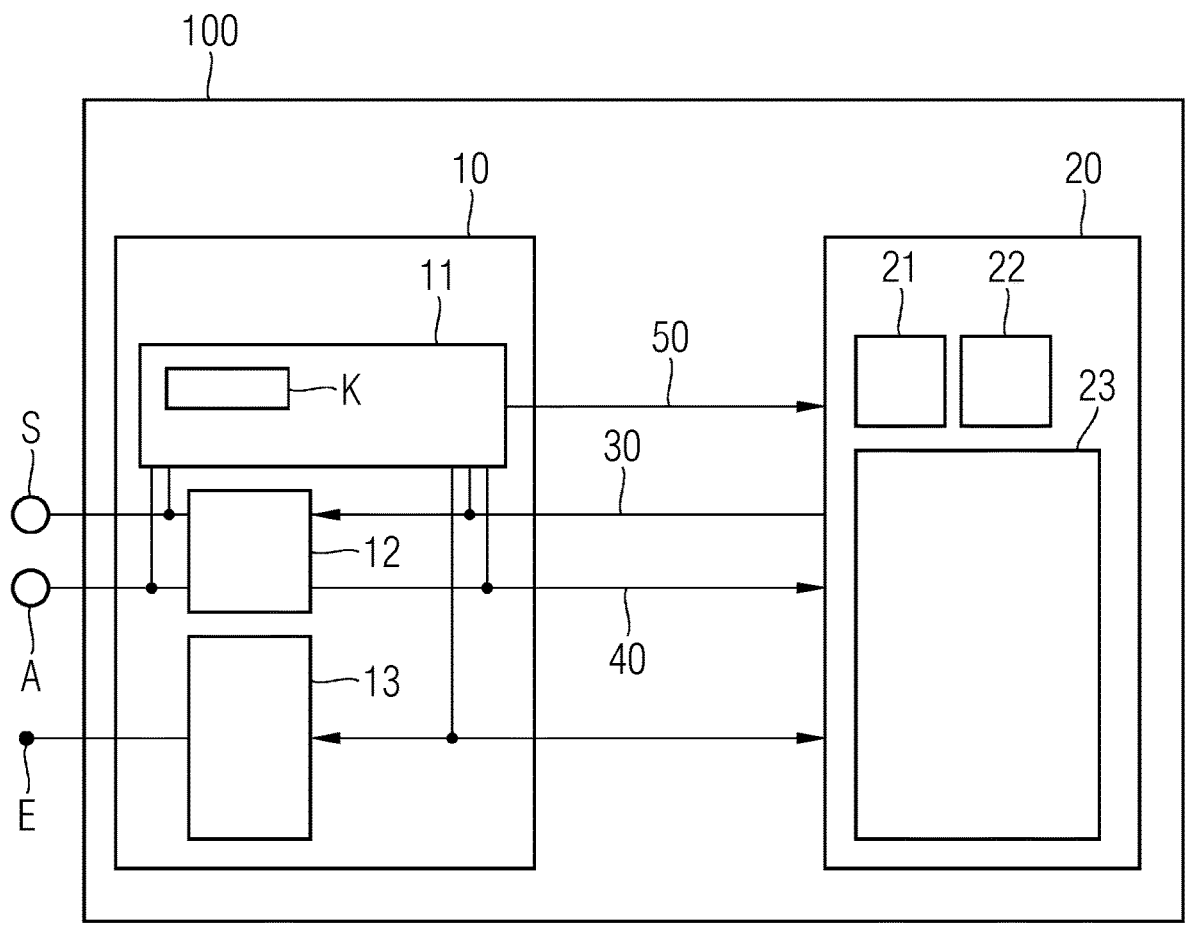
FIG. 2 shows a schematic representation of a system on chip with programmable hardware and means for carrying out the method according to a second example embodiment of the invention.

FIG. 2 shows schematically a system on chip 100 with programmable hardware 10, for example an FPGA, and a programmable processor, a CPU 20. Via an operating system 23, applications 21, 22 can access an input/output unit 12 which is implemented by the programmable hardware 10. Sensors S and actuators A, in particular, are connected. Control commands 30 are transmitted and measurements 40 are acquired and evaluated by software of the CPU 20. A network interface 13 is furthermore provided, for example an Ethernet interface, via which the software can exchange data with other systems using a data communication protocol, for example diagnostic or configuration data in a SCADA system or higher-level control computer.

A snapshot capture unit 11 is furthermore provided and is implemented as part of the programmable hardware 10. This may be implemented, for example, as a VHDL module or Verilog module. It may be implemented as digital logic or via a soft CPU, or as a combination of digital logic and soft CPU. The snapshot capture unit 11 can access commands, measurements and parts of the data communication via internal interfaces, preferably with read-only functionality. A repercussion-free listening in to the signals or the communication can be achieved through the read-only access. A driver function can be provided, or a buffer register or a latch or a dual-port RAM in order to buffer the acquired value of a signal without repercussions. With an input/output interface, the snapshot capture unit 11 can read off sensor or actuator quantities directly at the input or downstream of the interface block.

The snapshot capture unit 11 comprises a cryptographic key K, for example a signature key as a private asymmetric key or a symmetric cryptographic key. The snapshot capture unit 11 picks up signals on a random sample basis and stores them internally. If a complete random sample set is present, a cryptographically protected random sample set can be provided. To do this, the key K is used, for example, to form a digital signature or a message-checking code, referred to as a message authentication code, using the acquired random sample data. The cryptographically protected random sample 50 is provided to the CPU 20. Software which is executed on the CPU 20 can forward the random sample via the network interface 13 or can check it locally. Advantageously, the acquired random samples are trusted, since they are acquired directly in hardware, i.e. on the programmable hardware 10, and are cryptographically protected there. They cannot therefore be modified unnoticed by a software code of the CPU 20 which could be manipulated.

Figure 3:
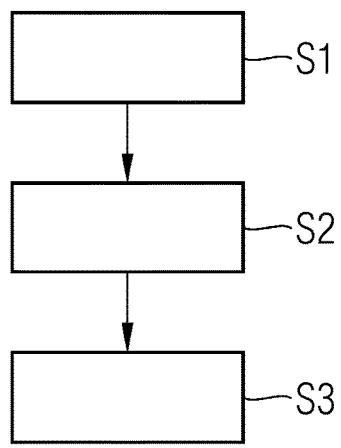
FIG. 3 shows a flowchart of the method.

FIG. 3 shows schematically the sequence of the method steps of the determination S1, on a random sample basis, the cryptographically protected provision S2 and the checking S3. The method steps are advantageously carried out in the sequence shown.

Although the invention has been illustrated and described in detail through the example embodiments, the invention is not limited by the disclosed examples, and other variations can be derived therefrom by the person skilled in the art without departing the protective scope of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for monitoring an integrity of a distributed system, the method comprising:
   acquiring, by a processor of a computing system, on a random sample basis, a cryptographically protected test dataset by adding a cryptographic checksum to a test dataset that is extracted from a dataset that is to be transmitted via a communication connection of the distributed system; and
   checking, by the processor, the integrity of the cryptographically protected test dataset using cryptographic calculations, wherein the checking is independent of a transmission of the dataset via the communication connection.

2. The method as claimed in claim 1, wherein a communication via the communication connection is a control communication and control data or sensor values or input or output signals from sensors or actuators are transmitted as the dataset.

3. The method as claimed in claim 1, wherein a result which confirms the integrity of the cryptographically protected test dataset provides an alarm signal.

4. The method as claimed in claim 3, wherein the result certifies the integrity by means of cryptographically protected information.

5. The method as claimed in claim 1, wherein the test dataset is acquired as a limited, digital signal extract on an input or output interface of a control device.

6. The method as claimed in claim 1, wherein the random sample basis is carried out depending on a random value or on specified times or on measured quantities.

7. The method as claimed in claim 1, wherein a symmetric or asymmetric key pair, is used for the cryptographic calculations.

8. The method as claimed in claim 1, wherein a plausibility information is used in addition to the cryptographic calculations as part of the checking, further wherein the plausibility information relates to a further test dataset or the dataset that is to be transmitted or data of the distributed system.

9. A crypto-arrangement for monitoring an integrity of a distributed system, comprising:
   a processor of a computing system, the processor configured to:
      acquire, on a random sample basis, a cryptographically protected test dataset by adding a cryptographic checksum to a test dataset that is extracted from a dataset that is to be transmitted via a communication connection of the distributed system; and
      check the integrity of the cryptographically protected test dataset using cryptographic calculations, wherein the cryptographically protected test dataset is checked independent of a transmission of the dataset via the communication connection.

10. The crypto-arrangement as claimed in claim 9, wherein a communication via the communication connection is a control communication and the dataset has control data or sensor values or input or output signals of sensors or actuators.

11. The crypto-arrangement as claimed in claim 9, wherein the processor is coupled to an integrated component of a control device or of a sensor or actuator.

12. A computer program product, comprising a computer readable hardware storage device having computer readable program code stored therein, said program code executable by a processor of a computer system to implement a method with a first computer program which has means for carrying out the method as claimed in claim 1 if the first computer program is implemented on a first program-controlled device for execution.

13. The computer program product as claimed in claim 12, wherein the first computer program is executable on the first program-controlled device separately from a further computer program which has means for the performance of a control, if the further computer program is implemented on a further program-controlled device for execution.

* * * * *